(12) United States Patent
Cho et al.

(10) Patent No.: US 7,479,978 B2
(45) Date of Patent: Jan. 20, 2009

(54) APPARATUS AND METHOD FOR PERFORMING INVERSE TELECINE PROCESS

(75) Inventors: Nam-ik Cho, Seoul (KR); Hyung-il Koo, Seoul (KR); Jun-won Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 825 days.

(21) Appl. No.: 10/865,044

(22) Filed: Jun. 9, 2004

(65) Prior Publication Data

US 2005/0057646 A1    Mar. 17, 2005

(30) Foreign Application Priority Data

Jun. 10, 2003    (KR)    ............... 10-2003-0037138

(51) Int. Cl.
*H04N 3/36*    (2006.01)

(52) U.S. Cl. .................... 348/97; 348/441

(58) Field of Classification Search .............. 348/96, 348/441
See application file for complete search history.

(56) References Cited

U.S. PATENT DOCUMENTS 5,844,618 A    12/1998    Horiike et al.
6,031,927 A *  2/2000    Rao et al. ............... 382/100
6,411,336 B1 * 6/2002    Harrington ............. 348/559

FOREIGN PATENT DOCUMENTS

| GB | 2 240 232 A | 7/1991 |
| JP | 2000-217084 | 2/2003 |
| WO | WO 02/056597 A1 | 7/2002 |

* cited by examiner

*Primary Examiner*—Young Lee
*Assistant Examiner*—Richard Torrente
(74) *Attorney, Agent, or Firm*—F. Chau & Associates, LLC

(57) ABSTRACT

Provided are a method and an apparatus for performing an inverse telecine process, and a recording medium to store a computer program for performing the inverse telecine method in a computer. The method for performing inverse telecine process includes calculating a total, for each frame of telecine images, of the absolute differences in odd and even field luminance values localized in a plurality of n×m pixel blocks that compose the frame. The calculated Frame Totals of Absolute Local Field Difference for five frames are normalizing components and outputting as a (row) vector; and the (row) vector of the normalized Frame Totals of Absolute Local Field Difference are compared to a plurality of templates to identify or reconstruct original film frames, which are recovered from the input video frames and output at a rate of N frames per second.

20 Claims, 4 Drawing Sheets

APPARATUS AND METHOD FOR PERFORMING INVERSE TELECINE PROCESS

BACKGROUND OF THE INVENTION

This application claims the priority of Korean Patent Application No. 2003-37138, filed on Jun. 10, 2003, in the Korean Intellectual Property Office, the disclosure of which is incorporated herein in its entirety by reference.

1. Field of the Invention

The present invention relates to a video processing method and a video processing apparatus, and more particularly, to a method and an apparatus for performing an inverse telecine process by identifying telecine images composed of fields from different frames by calculating for each frame the total absolute local (within a given block) difference between the luminance of pixels of each field (within the block), as a field-correlation indicator. Also, the present invention relates to a computer-readable recording medium, which stores a computer program for performing the inverse telecine method.

2. Description of the Related Art

FIG. 1 is a view for describing a telecine process and an inverse telecine process. Inverse telecine ("IVTC" or "3:2 Pulldown") is applicable to cinematic film content that was transferred to NTSC video. Because film is filmed at 24 frames per second (fps) and the NTSC standard is 30 fps, a "telecine" process must be used to add (duplicate) certain frames when the film content is transferred to video. When the content is converted back from 30 fps to 24 fps (e.g., when video content is encoded using digital technology), an inverse telecine process is used to remove these duplicate frames, thus saving file size.

Movies, advertisements, or TV soap operas (hereinafter referred to collectively as movies) filmed using a movie camera are produced at 24 fps (frames per second). To be displayed by a National Television System Committee (NTSC) broadcasting system, the movies must be converted into 30 fps rate form. The conversion is made by adding (interlacing) duplicated fields to a selected one of the original fields of a frame (image) to produce telecine images. A telecine machine does something called pulldown, which, in its simplest explanation, "pulls down" an extra frame every fourth frame to make five whole frames instead of four. Every four frames are converted into five frames by adding two additional (interlaced) fields. This process is referred to as a telecine process or a 3:2 pull-down process.

While NTSC has a frame rate of 29.97, the screen is actually being partially redrawn every 59.94 times a second. A half-frame is being drawn to the screen every 60th of a second, in other words. This leads to the notion of fields. The "Top" field of a frame includes all of the pixels in the "odd" horizontal lines of the frame, including the top horizontal line. The "Bottom" field of a frame includes all of the pixels in the "even" horizontal lines of the frame, including the top bottom line. Each full scan of even numbered lines, or odd numbered lines constitutes a "field". Thus, each field contains half of the image data of one frame, and two fields (top and bottom fields) are interlaced to form one frame.

Telecined 30 fps frames are usually 3 progressive frames followed with 2 interlaced frames. The first frame of film is represented by 2 fields of video; the second frame of film is represented by 3 fields of video (1.5 frames); the third frame of film is again represented by two fields and the fourth frame of film is represented by 3 fields, and so on.

Referring to FIG. 1, FF1 through FF4 represent film frames, 1T, 1B, 1T(r), 2B, 2T, 3B, 3T, 3B(r), 4T, and 4B represent fields formed (extracted from frames) by the 3:2 pull-down processes, and BF1 through BF5 represent video frames formed through a telecine process (also called a "3:2 pull-down" process).

Here, generally, iT (where "i" is natural number) denotes the top field of an i-th frame, iB is the bottom field of the i-th frame, iT(r) is a duplicate of the top field of the i-th frame, and iB(r) is a duplicate of the bottom field of the i-th frame.

FIG. 2 is a simple block diagram illustrating the basic input and output of an apparatus 200 for implementing an inverse telecine process. Referring to FIGS. 1 and 2, the inverse telecine (or de-interlacing) is a process for reconverting a video frame (VF) at 30 fps (exactly, 29.976 fps) back into a film frame (FF) at 24 fps (exactly 23.976 fps).

The inverse telecine process is for recovering the original film frame (FF) by exactly identifying the video frame (VF, hereinafter referred to as telecine image) formed by a 3:2 pull-down process.

The most critical operation in the inverse telecine (or de-interlacing) process is identifying (recognizing) the 3:2 pull-down process (sequence). In a case where the 3:2 pull-down process (sequence) is changed by noise or by a changed scene, the film frames (FF) recovered may not be recovered exactly the same as the original film frames.

SUMMARY OF THE INVENTION

The present invention provides a method and an apparatus for reliably performing an inverse telecine process, in which a film frame sequence exactly the same as an original film frame sequence can be recovered from a telecine video stream with a small calculation complexity and high accuracy without being affected by noise.

Embodiments of the present invention also provide a recording medium to store a computer program for performing the inverse telecine method in a computer.

According to an aspect of the present invention, there is provided a method for performing an inverse telecine process, including the steps of: calculating the Frame Totals of Absolute Local Field Difference (FT) of a plurality of telecine images that are input at a rate of M frames per second (here, M is natural number); normalizing the Frame Totals of Absolute Local Field Difference (FT) and outputting a (row) vector of the normalized Frame Total of Absolute Local Field Difference (NFT) that are normalized in a five-frame unit; and comparing the (row) vector of the normalized Frame Total of Absolute Local Field Difference (NFT), to a plurality of templates, and controlling the number of video frames that are input in the rate of M frames per second, and the number original film frames, which are recovered from the input video frames and output in a rate of N (here, N is natural number) frames per second. The Frame Total of Absolute Local Field Difference (FT) represents the total difference in the luminance of pixels in adjacent odd and even fields in one frame and indicates the correlation between the odd and even fields the frame The step of calculating the Frame Totals of Absolute Local Field Difference of the input video frames may include the substeps of: dividing each of the video frames into a plurality of n×m pixel blocks; calculating the Absolute Local Field Difference of each of a plurality of n×m pixel block, which is defined as the absolute value of the difference between the luminance values of pixels on odd lines of tone n×m pixel block and the luminance values of pixels on even lines of the one n×m pixel block; and calculating the Frame Total of Absolute Local Field Difference for each frame which is defined as sum of the Absolute Local Field Differences for each of the plurality of n×m pixel blocks forming a respective video frame.

According to another aspect of the present invention, there is provided a recording medium to store a computer program for performing the inverse telecine method in a computer, the inverse telecine method including the steps of: calculating Frame Totals of Absolute Local Field Difference of respective telecine images input at a rate of M (here, M is natural number) frames per second; normalizing the Frame Totals of Absolute Local Field Difference and outputting a (row) vector of five normalized Frame Totals of Absolute Local Field Difference (NFT) that are normalized per every five frames; and comparing the (row) vector of the normalized Frame Totals of Absolute Local Field Difference (NFT) to a plurality of templates, and controlling the number of video frames which are input at the rate of M frames per second and the number original film frames, which are recovered from the input video frames and output in a rate of N (here, N is natural number) frames per second.

The step of calculating the Frame Total of Absolute Local Field Difference (FT) of each the input video frames may include the Substeps of: dividing each of the video frames into a plurality of n×m pixel blocks; calculating, for each of the plurality of blocks, the absolute value of the difference between the luminance values of pixels on odd lines of one n×m pixel block and the luminance values of pixels on even lines of the one n×m pixel block; and calculating the total sum of the absolute values for the plurality of n×m pixel blocks forming one of the video frames.

According to still another aspect of the present invention, there is provided an apparatus for performing an inverse telecine process, comprising: a Field Difference Detection Unit for calculating Frame Totals of Absolute Local Field Difference of the telecine images input at a rate of M (here, M is natural number) frames per second; a normalization unit for normalizing (five) Frame Totals of Absolute Local Field Difference that are output from the Field Difference Detection Unit, and for outputting a (row) vector of Frame Totals of Absolute Local Field Difference which are normalized in the five-frame unit; a comparing unit for comparing the (row) vector of normalized Frame Totals of Absolute Local Field Difference, to a reference template, and for outputting compared result; and a frame buffer unit for controlling the number of video frames input at the rate of M frames per second and the number of original film frames, which are recovered from the input video frames and for outputting the recovered frames at a rate of N (here, N is natural number) frames per second.

The Field Difference Detection Unit may be adapted to divide the video frame respectively into a plurality of n×m pixel blocks, calculate, for each of the plurality of blocks, the absolute value of the difference between the luminance of pixels on odd lines of one block and luminance of pixels on even lines of the one block, and calculate the Frame Total of Absolute Local Field Difference, which is defined as sum of the absolute values of the plurality of n×m pixel blocks that form the video frame.

The above apparatus may further include a look-up table storing a plurality of templates. The comparing unit may include: a first comparator comparing the (row) vector of normalized Frame Totals of Absolute Local Field Difference, which are normalized per five-frame unit, to the plurality of templates stored in the look-up table, and outputting an output signal according to the comparison result; and a second comparator comparing a reference template to the output signal from the first comparator, to output a frame load signal and a synthesis command as the comparison result. In addition, the frame load signal may control the number of video frames input at a rate of M frames per second, and the synthesis command may designate the synthesizing method of the telecine images.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
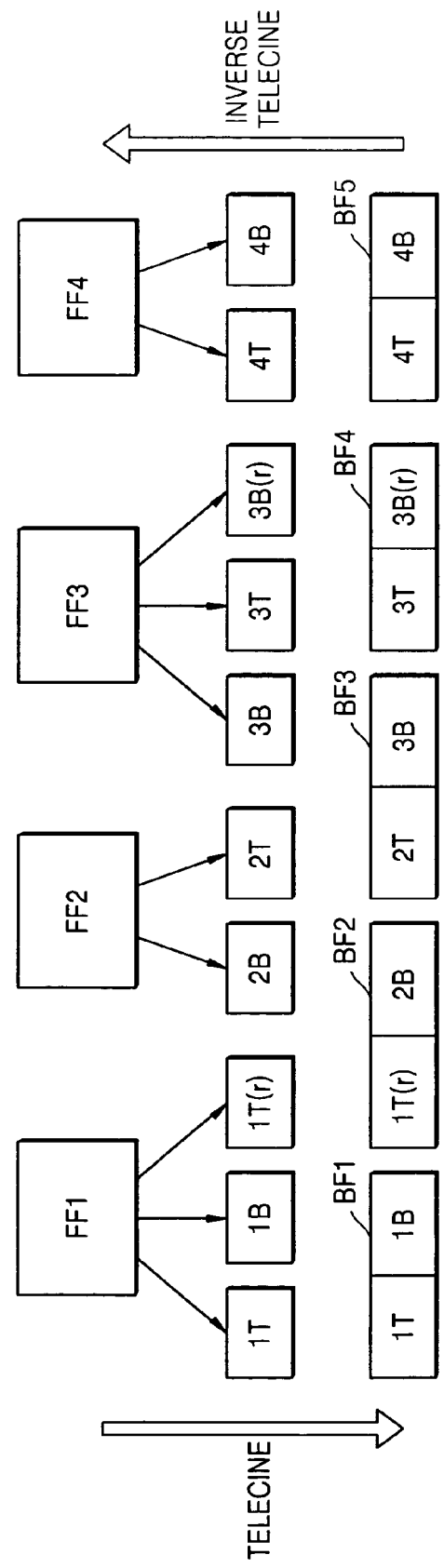
FIG. 1 is a diagram for describing a telecine process of the related art and an inverse telecine process.
Figure 2:
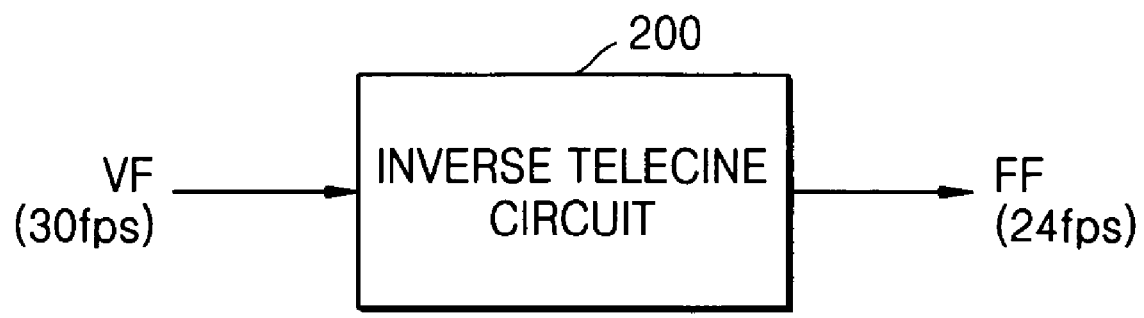
FIG. 2 is a simple block diagram of an apparatus for implementing any method for performing an inverse telecine process.

The most preferred embodiment of the present invention will be described with reference to the accompanying figures. Same reference numerals in the figures denote the same elements.

A method and an apparatus for performing an inverse telecine process according to the present invention will be described with reference to FIGS. 1, 3, and 4.

A telecine image BF2 (among telecine image sequence BF1, BF2, BF3, BF4, and BF5) is made by combining a duplicated field 1T(r) and a field 2B, where a predetermined timing difference (for example, $\frac{1}{24}$ second) exists between the duplicated field 1T(r) and the field 2B where they are found in the original film frames (FF).

Similarly, the telecine image BF3 is made by combining a field 2T and a field 3B, where a predetermined timing difference (for example, $\frac{1}{24}$ second) exists between the field 2T and the field 3B where they are found in the original film frames (FF).

The Frame Totals of Absolute Local Field Difference of the frames BF2 and BF3, which are formed by combinations of the fields photographed at different times (e.g., (1T(r), 2B), and (2T, 3B) respectively), are greatly different from those of Frame Totals of Absolute Local Field Difference of the frames BF1, BF4, and BF5 which are formed by combinations of fields, photographed at the same time (e.g., (1T, 1B), (3T, 3B(r)), and (4T, 4B) respectively).

Thus, the telecine images can be detected by measuring and comparing the Frame Totals of Absolute Local Field Difference of the frames using a method and apparatus for performing the inverse telecine process. It is noted that one skilled in the art readily appreciates that the term "The Frame Total of Absolute Local Field Difference (FT)" can also be referred to as the total sum of the "π frequency component (fπB)" for each of the plurality of blocks in a frame.

Thus, the telecine image may be detected by detecting frequency components in length directions of the respective frames, and the telecine image is normalized. Then, arrangements (sequence) of the current five telecine images are recognized from the normalized values, and the original film frame (FF) may be recovered from the recognized arrangement (sequence).

Figure 3:
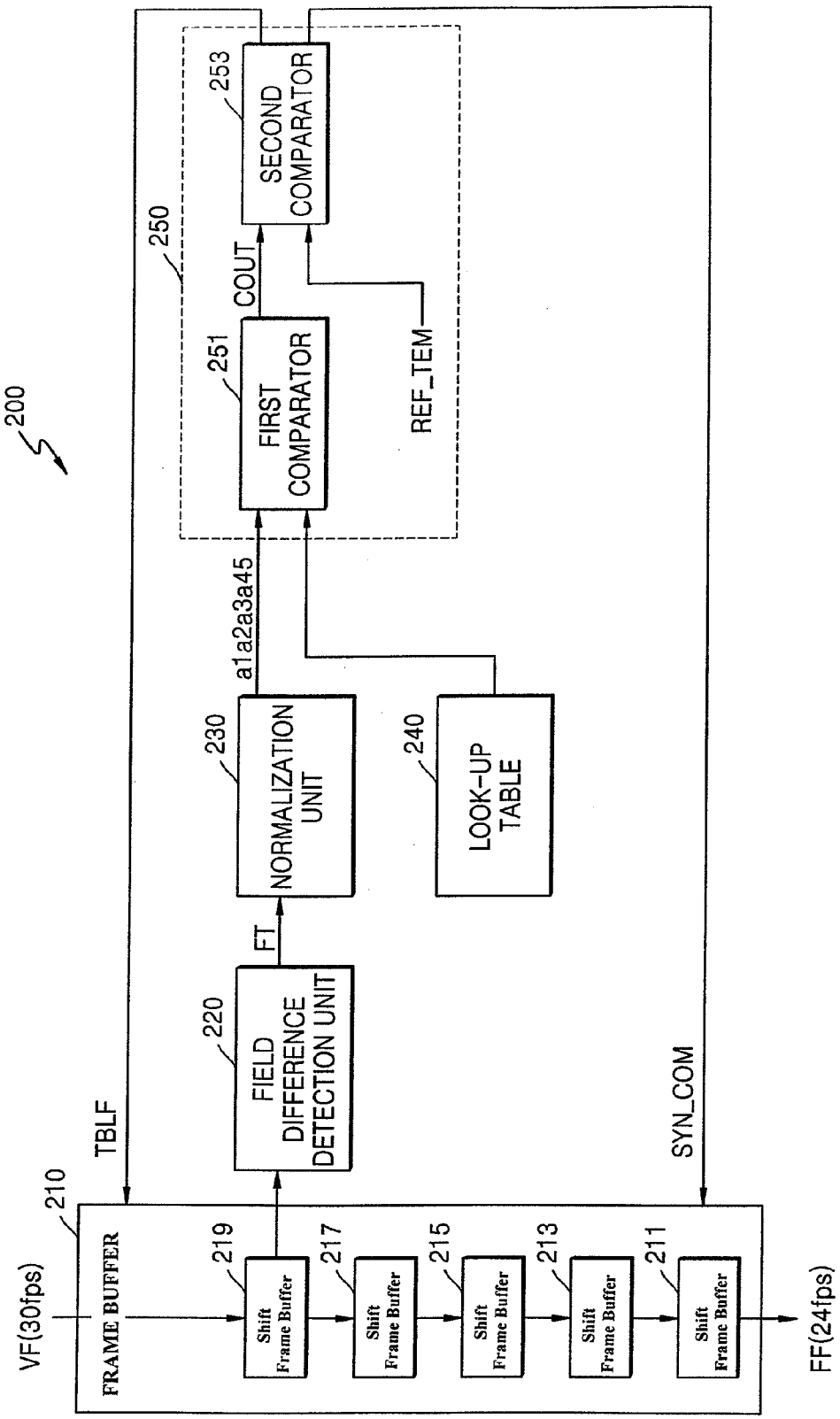
FIG. 3 is a detailed block diagram of an apparatus for performing an inverse telecine process according to an embodiment of the present invention.

FIG. 3 is a block diagram of an apparatus adapted to perform the inverse telecine process according to the method of the present invention.

Referring to FIG. 3, the inverse telecine apparatus 200-I includes a frame buffer unit 210, a Field Difference Detection Unit 220, a normalization unit 230, a look-up table 240, and a comparing unit 250.

The frame buffer unit 210 includes five shift frame buffers 211, 213, 215, 217, and 219 connected in series. The respective shift frame buffers 211, 213, 215, 217, and 219 of the frame buffer unit 210 receive telecine images VF input at a rate of 30 fps, control the number of input telecine images as responding to a frame load signal (TBLF) output from the comparing unit 250, and recover the original film frame FF by synthesizing the telecine images as responding to a synthesis command (SYN_COM).

Each of the telecine images VF is sequentially shifted from the frame buffer 219 to the frame buffer 211 and stored therein.

The Field Difference Detection Unit 220 divides a telecine image into blocks having predetermined dimensions (for example, 4×4 pixels), and calculates the Absolute Local Field Difference of each of the blocks.

The Absolute Local Field Difference (ALFD) of the block can be calculated using Equation 1.

$$ALFD = |\Sigma ODD\_Y - \Sigma EVEN\_Y| \quad \text{[Equation 1]}$$

Here, $\Sigma ODD\_Y$ is sum of luminance values (Y) of all pixels on odd lines forming one block, and $\Sigma EVEN\_Y$ is sum of luminance values of all pixels on even lines forming one block.

Therefore, the Absolute Local Field Difference for one block is represented by an absolute value of the difference between the sum of luminance of all pixels on the odd lines ($\Sigma ODD\_Y$) and the sum of luminance of all pixels on the even lines ($\Sigma EVEN\_Y$), within that block.

Thus, the Frame Total Field Difference of one frame is the sum of the Absolute Local Field Difference of all the blocks forming the frame. The value of this Frame Total Field Difference for one whole frame may vary depending upon the selected dimensions of the n×m pixel blocks, but will be inversely related to the degree of correlation between the Top and Bottom fields in the frame. The TOTAL will be smaller for original film frames (FF), and will be greater for telecine frames (Video Frames, VF, composed of fields derived from different frames). Thus, the invention provides a field-correlation algorithm whereby telecine frames (Video Frames, VF, composed of top and bottom fields derived from different frames) may be distinguished from original film frames (FF) (composed of top and bottom fields of the same film frame).

In a case where a difference between the Frame Total Field Difference of a given frame (for example, BF2 in FIG. 1) and a predetermined threshold value (e.g., the median value) is large, the given frame (e.g., BF2) is probably the combination of the top field (e.g., 1T(r)) of one film frame (e.g., FF1) and the bottom field (e.g., 2B) of another film frame (e.g. FF2).

Here, it is desirable that the predetermined threshold value is the median value of the Frame Total Field Difference (FT) of five consecutive frames (e.g., BF1 through BF5 in FIG. 1).

The Field Difference Detection Unit 220 calculates the Frame Total Field Difference of the frames, and outputs the calculation result to the normalization unit 230.

Thus, the Field Difference Detection Unit 220 divides the telecine images VF respectively into a plurality (PB) of n-pixel by m-pixel blocks (e.g., where n=m, to produce n×n pixel blocks) (here, n and m are natural numbers, e.g., integers), calculates the absolute value of the difference between the luminance of pixels on the odd lines of n×m pixel block and the luminance of pixels on the even lines within the n×m pixel block, and calculates the Frame Total Field Difference (FT) of the frame which is defined as the sum of Absolute Local Field Difference values of the plurality (PB) of n×m pixel blocks forming the telecine image (frame).

The normalization unit 230 normalizes the Frame Total Field Difference (FT) for each respective frame, and outputs a normalized "magnitude (row) vector" (a1a2a3a4a5) comprising the normalized Frame Total Field Differences (NFT) of five consecutive frames.

The normalization process is performed to make the normalized Frame Totals of Field Difference (NFT) of the frame having the median value equal to 0, and to make the normalized Frame Total Field Difference (NFT) of other frames equal to 1.

The normalization is performed according to Equation 2.

$$NFT = \left| \frac{FTi - MD}{\sigma} \right| \quad \text{[Equation 2]}$$

Here, FTi is Frame Total Field Difference (FT) of i-th frame, MD represents the median value, and σ represents a standard deviation.

In addition, the value NFT calculated for each frame by Equation 2 is clipped by a predetermined value so that NFT of each frame is between 0 and 1.

However, if the standard deviation σ is too small, the value NFT calculated by equation 2 increases. Therefore, Equation 3 can be used for the normalization process.

$$NFT = \left| \frac{FTi - MD}{\max(\sigma, \sigma_0)} \right| \quad \text{[Equation 3]}$$

Here, $\sigma_0$ is a predetermined constant.

Therefore, the normalized Frame Total Field Differences (NFT) of the frames including the fields photographed at the same time (e.g., BF1, BF4, and BF5 comprised of fields (1T, 1B), (3T, 3B(r)), (4T, 4B) respectively) are approximately equal to 0, and the normalized Frame Total Field Differences (NFT) of the respective frames including the fields photographed at different times from each other (e.g., BF2, and BF3 comprised of fields (1T(r), 2B), (2T, 3B) respectively) are approximately equal to 1.

The look-up table 240 includes a (row) vector of real numbers having five digits b1b2b3b4b5 (hereinafter, referred to as templates). The look-up table 240 may include a read only memory (ROM).

The comparison unit 250 includes a first comparator 251 and a second comparator 253. The first comparator 251 compares the (row) vector of normalized Frame Total Field Differences (a1a2a3a4a5) to respective templates stored in the look-up table 240 using Equation 4, and outputs the compared results (COUT).

$$Cp = \sum_{i=1}^{5} |ai - bi|.$$ [Equation 4]

Here, ai represents an element in the normalized (row) vector of Frame Total Field Differences (NFT), and bi represents an element among templates.

Therefore, the first comparator 251 searches for a template having the smallest value of Cp, and outputs an output signal (COUT) corresponding to that template.

There are many templates stored in the look-up table 240, however the templates which can be stored in the inverse telecine apparatus of the present invention are shown in Table 1.

TABLE 1

| Templates stored in the look-up table | COUT |
|---|---|
| 11000 | 1 |
| 01100 | 2 |
| 00110 | 3 |
| 00011 | 4 |
| 10001 | 5 |
| 11001 | 6 |
| 10011 | 7 |
| 11011 | 8 |
| 10110 | 9 |
| 10000 | 10 |

The second comparator 253 receives the output signal (COUT) of the first comparator 251, compares the received output signal (COUT) to the number corresponding to a reference template (REF_TEM), decides whether the output signal COUT of the first comparator will be approved or rejected with the compared result, and outputs a frame load signal (TBLF) and a synthesis command (SYN_COM) to the frame buffer unit 210 as the decided result.

If the second comparator 253 approves the output signal (COUT) of the first comparator 251, the second comparator 253 outputs the frame load signal TBLF corresponding to the output signal COUT of the first comparator 251 to the frame buffer unit 210 as shown in Table 2. If the second comparator 253 rejects the output signal COUT of the first comparator 251, the second comparator 253 ignores the output signal COUT of the first comparator 251, and outputs the frame load signal TBLF corresponding to the reference template REF_TEM to the frame buffer unit 210.

Here, the frame load signal TBLF is a controlling signal for controlling the number of telecine images VF input into the frame buffer unit 210, and the synthesis command SYN_COM is a commanding signal for commanding how to synthesize the telecine images stored in the frame buffers 211, 213, 215, 217, and 219.

Table 2 shows the frame load signals TBLF according to the output signal COUT of the first comparator 251 and the synthesizing methods of the frame buffer unit 210 corresponding to the synthesis command SYN_COM.

TABLE 2

| COUT | TBLF | Synthesizing methods |
|---|---|---|
| 1(11000) | 5 | Outputting a frame synthesized from frames 1 and 2, and outputting frames 3, 4, and 5 unchanged |
| 2(01100) | 1 | Outputting frame 1 |
| 3(00110) | 2 | Outputting frames 1 and 2 unchanged |
| 4(00011) | 3 | Outputting frames 1, 2, and 3 unchanged |
| 5(10001) | 4 | Discarding frame 1, and outputting frames 2, 3, and 4 unchanged |
| 6(11001) | 4 | Outputting a frame synthesized from frames 1 and 2, outputting frames 3 and 4 unchanged |
| 7(10011) | 3 | Discarding frame 1, and outputting frames 2 and 3 unchanged |
| 8(11011) | 3 | Outputting a frame synthesized from frames 1 and 3, and outputting frame 3 unchanged |
| 9(10110) | 2 | Discarding frame 1, and outputting frame 2 unchanged |
| 10(10000) | 5 | Discarding frame 1, and outputting frames 2, 3, 4, and 5 unchanged |

Here, frames "1" through "5" mean respectively the telecine images stored in the frame buffers 211, 213, 215, 217, and 219 respectively.

The frame buffer unit 210 differentiates between a "top field first" (TFF) and a "bottom field first" (BFF) telecine synthesizing method.

For example, in a case where 11000 is synthesized in the "top field first" (TFF) method, the top field of first frame and the bottom field of second frame are combined to form one film frame. Conversely, in a case where 11000 is synthesized in the "bottom field first" (BFF) method, the bottom field of the first frame and the top field of the second frame are combined to form one film frame.

Therefore, the frame buffer unit 210 can synthesize a restored film frame by combining the bottom field (e.g., 2B) of a telecine video frame (e.g., BF2) with the top field (e.g., 2T) of the telecine video frame (e.g., BF3) as shown in FIG. 1 in response to the synthesis command SYN_COM.

Hereinafter, operations of the apparatus for performing the inverse telecine process in a case where the reference template REF_TEM is 1,1,0,0,0 (the number corresponding to the (1,1,0,0,0) is 1) will be described in detail.

In a case where the normalized (row) vector of the Frame Total Field Differences (a1a2a3a4a5) is 0.1, 0.9, 0.9, 0.1, 0.2, the first comparator 251 selects a template (0, 1, 1, 0, 0) having the smallest Cp among the templates forming the look-up table 240 according to Equation 4, and outputs the number 2 corresponding to the selected result to the second comparator 253.

Since the output signal (COUT=2) of the first comparator 251 and the number (1) corresponding to the reference template (1,1,0,0,0) are different from each other, the second comparator 253 decides whether to approve or to reject the output signal (COUT=2) of the first comparator 251.

If the output signal (COUT=2) is approved, the second comparator 253 outputs the synthesis command SYN_COM representing the synthesizing method shown in Table 2 and the frame load signal TBLF having the value of "1" to the frame buffer unit 210.

Therefore, the frame buffer unit 210 outputs one telecine image (or frame) stored in the frame buffer 211 in response to the synthesis command SYN_COM and the frame load signal TBLF of the value 1, and the frame buffer 219 receives a new telecine image VF.

Here, the telecine images stored in the frame buffers 219, 217, 215, and 213 are shifted, respectively, into the frame buffers 217, 215, 213, and 211.

The Field Difference Detection Unit 220 calculates the Frame Total Field Difference (FT) of the new telecine image VF input into the frame buffer 219, and outputs the calculation result (FT) to the normalization unit 230.

Since the normalization unit 230 outputs the (row) vector (a1a2a3a4a5) of the Frame Total Field Differences (NFT) which is normalized per every five frames, it can be anticipated that 1 is output from the first comparator 251.

Also, in a case where the (row) vector (a1a2a3a4a5) of the normalized Frame Total Field Differences (NFT) is 0.9,0.9, 0.1,0.1,0.9, the first comparator 251 selects the template (1,1, 0,0,1) having the smallest Cp among the templates forming the look-up table 240 according to the Equation 4, and outputs the number 6 corresponding to the selected result to the second comparator 253.

Since the output signal (COUT=6) of the first comparator 251 and the number (1) corresponding to the reference template 1,1,0,0,1 are different from each other, the second comparator 253 decides whether to approve the output signal (COUT=6) of the first comparator 251 or reject it.

In a case where the template 1,1,0,0,0 is decided to the template 1,1,0,0,1 since the template 1,1,0,0,0 has noise, the second comparator 253 rejects the output signal (COUT=6) of the first comparator 251 and selects the number 1 corresponding to the template 1,1,0,0,0. Therefore, the second comparator 253 outputs the synthesis command SYN_COM representing the synthesizing method shown in Table 2 and the frame load signal TBLF having a value of "5" to the frame buffer unit 210.

The frame buffer unit 210 synthesizes the telecine images stored in the frame buffers 211 and 213 in the top field first method or in the bottom field first method as responding to the synthesis command SYN_COM and the frame load signal TBLF having a value of "5" and outputs the merged images as a film frame, and outputs the telecine images stored in the frame buffers 215, 217, and 219 as they are. Here, the frame buffer unit 210 receives five new telecine images sequentially.

However, as a result of determination by the second comparator 253, if the output signal COUT output from the first comparator 251 is 6, the second comparator 253 a synthesis command SYN_COM representing the synthesizing method shown in table 2 and a frame load signal TBLF having a value of "4" to the frame buffer 210.

Therefore, the frame buffer 210 synthesizes the telecine images stored in the frame buffers 211 and 213 in the top-field first method or the bottom field first method in response to the synthesis command SYN_COM and the frame load signal TBLF having the value of "4" and outputs the synthesized image as a film frame, and outputs the telecine images stored in the frame buffers 215 and 217 as they are. In that case, the frame buffer 210 receives new four telecine images sequentially.

The Field Difference Detection Unit 220 calculates the Frame Total Field Difference (FT) of each of the four telecine images input into the frame buffer 219, and outputs the calculation results to the normalization unit 230.

The normalization unit 230 outputs the (row) vector a1a2a3a4a5 of the (normalized) Frame Total Field Differences (NFT) which are normalized per every five frames, thus it can be anticipated that 1 will be output from the first comparator 251.

Thus, the apparatus 200-I for performing the inverse telecine process of the present invention normalizes the Frame Total Field Differences of the frames respectively, and controls the number of input video frames so that the (row) vector of the normalized Frame Total of Absolute Local Field Differences (NFT) can be expected as the reference template.

Therefore, according to the inverse telecine apparatus 200-I of the present invention, arrangements of the current five telecine images can be known through the normalization process, thus recovering the original film frame from the telecine images (or video frames) rapidly.

Figure 4:
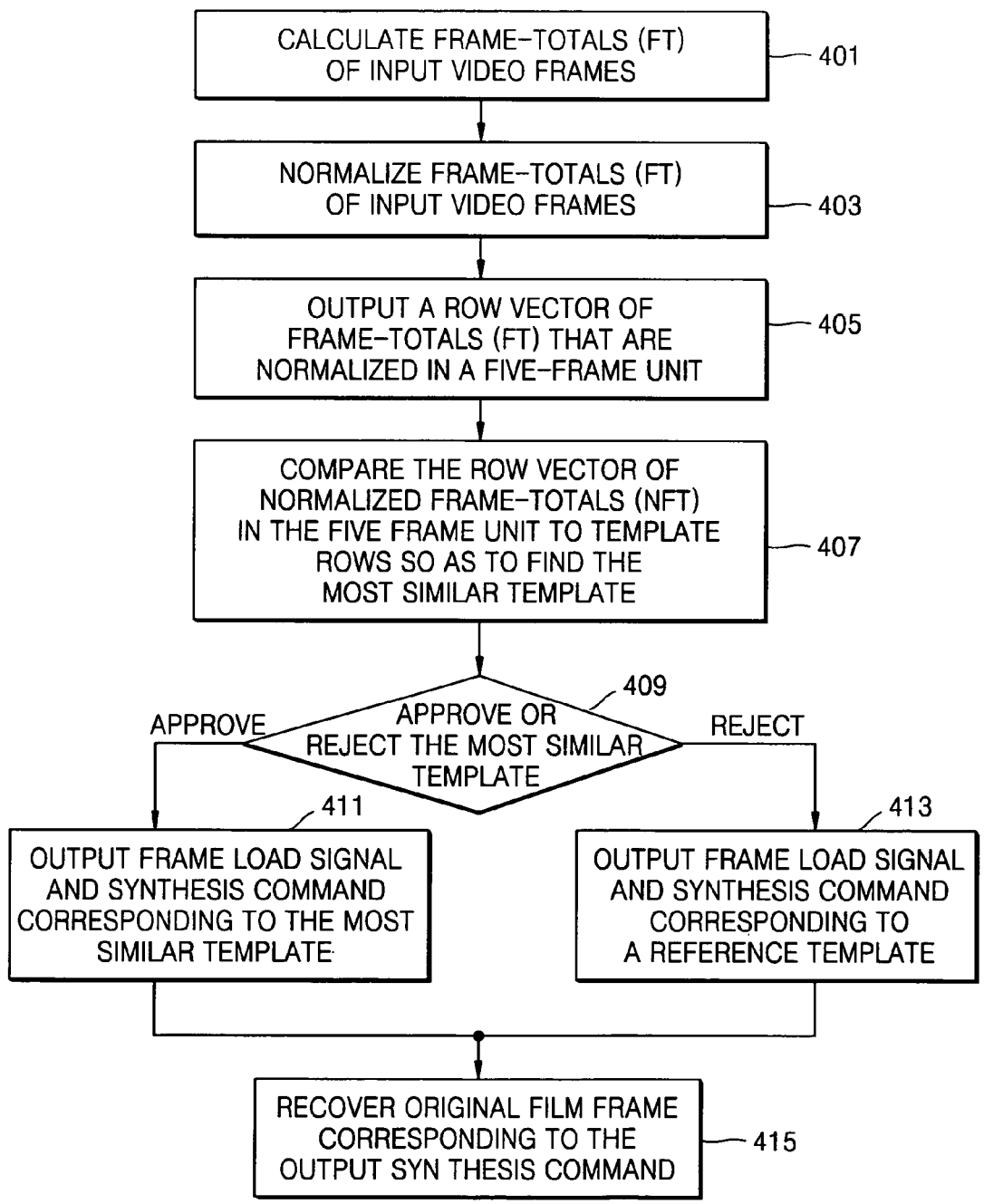
FIG. 4 is a flow chart of a method for performing an inverse telecine process according to an embodiment of the present invention.

FIG. 4 is a flow chart of an inverse telecine method according to the present invention.

Referring to FIGS. 3 and 4, the Field Difference Detection Unit 220 calculates the Frame Totals of Absolute Local Field Difference (FT) of the video frames VF respectively input in 30 pfs rate, and outputs the results (FT) to the normalization unit 230 sequentially (step 401).

The normalization unit 230 normalizes the Frame Totals of Absolute Local Field Difference (FT), which are input sequentially, through Equations 2 and 3 (step 403), and outputs a (row) vector (a1a2a3a4a5) of normalized Frame Totals of Absolute Local Field Difference (NFT) which are normalized per every five frames (step 405).

The first comparator 251 compares the (row) vector (a1a2a3a4a5) of normalized Frame Totals of Absolute Local Field Difference (NFT), which are normalized at every five frames, to the template stored in the look-up table 240 to find the template that is most similar to the (row) vector (a1a2a3a4a5) of the normalized Frame Totals of Absolute Local Field Difference (NFT) normalized by Equation 4 (step 407).

The second comparator 253 compares the template (or predetermined number) which has the smallest value of the Cp to the reference template REF_TEM (or predetermined number), and approves or rejects the template (step 409).

In a case where the second comparator 253 approves the template which has the smallest value of the Cp as a result of step 409, the second comparator 253 outputs the frame load signal TBLF corresponding to that template and the synthesis command SYN_COM to the frame buffer unit 210 (step 411).

However, in a case where the second comparator rejects the template which has the smallest value of the Cp as a result of step 409, the second comparator 253 outputs the frame load signal TBLF corresponding to the reference template REF_TEM and the synthesis command SYN_COM to the frame buffer unit 210 (step 413).

The frame buffer unit 210 controls the number of input telecine images in response to the frame load signal TBLF, and synthesizes the telecine images stored in the frame buffers 211, 213, 215, 217, and 219 in the way shown in Table 2 in response to the synthesis command SYN_COM, thus recovering the telecine images as the film frame FF (step 415).

Here, since the frame buffer unit 210 can recognize the arrangements of the current five telecine images through the normalization process, the frame buffer unit 210 can recover the original film frames from the telecine images in response to the synthesis command SYN_COM rapidly and easily and output the recovered original films at the 24 fps.

The inverse telecine method of the present invention can be realized as a computer program stored on a recording medium.

According to the method and apparatus for performing the inverse telecine process of the present invention, the telecine images can be detected by calculating the Frame Totals of Absolute Local Field Difference (FT) in the length direction of the video frame, thus recovering the original film frame from the telecine images with less sensitivity to noise.

Also, according to the method and apparatus of the present invention for performing inverse telecine process of the present invention, the original film frames can be recovered from the telecine images with less calculation and high accuracy since only the Frame Totals of Absolute Local Field Difference (FT) is calculated.

While the present invention has been particularly shown and described with reference to exemplary embodiments thereof, it will be understood by those of ordinary skill in the art that various changes in form and details may be made therein without departing from the spirit and scope of the present invention as defined by the following claims wherein n, m, N, M are natural numbers (e.g., integers).

What is claimed is:

1. A method for performing an inverse telecine process, the method comprising the steps of:
   calculating a Frame Totals of Absolute Local Field Difference (FT) for each frame of telecine images that are input at a rate of M frames per second;
   normalizing the Frame Totals of Absolute Local Field Difference (FT) and outputting a vector of normalized Frame Totals of Absolute Local Field Difference (NFT) that are normalized per every five frames, wherein the normalization is performed according to $$NFT = \left| \frac{FTi - MD}{K} \right|$$

wherein, FTi is Frame Total Field Difference (FT) of the i-th frame, MD represents the median value of the Frame Total Field Difference (FT) of five consecutive frames, and K represents a denominator;
   comparing the vector of the normalized Frame Totals of Absolute Local Field Difference (NFT) in a five-frame unit to a reference template; and
   controlling the number of video frames input at the rate of M frames per second and the number of original film frames that are recovered from the input video frames and output at a rate of N frames per second.

2. The method of claim 1, wherein each Frame Total of Absolute Local Field Difference (FT) is the sum of the absolute values of the difference between the sum of the luminance values of pixels on every odd line of one pixel region and the sum of the luminance values of pixels on every even line of the one pixel region, for a plurality of n×m pixel regions in each video frame.

3. The method of claim 1, wherein calculating the Frame Total of Absolute Local Field Difference (FT) of each of the input video frames comprises:
   dividing each of the video frames into a plurality of n×m pixel pixel regions;
   calculating Absolute Local Field Difference for each of the plurality of pixel regions, which are defined as the absolute value of the difference between the sum of the luminance values of pixels on every odd line of the pixel region and the sum of the luminance values of pixels on every even line of the pixel region; and
   calculating the Frame Total of Absolute Local Field Difference (FT) which are defined as sum of the Absolute Local Field Difference of all of the plurality of pixel regions forming the respective video frame.

4. The method of claim 1, further comprising clipping the NFT value of each frame so that the NFT of each frame is between 0 and 1.

5. A computer-readable recording medium having recorded thereon a computer program for performing an inverse telecine method, the inverse telecine method comprising:
   calculating the Frame Totals of Absolute Local Field Difference (FT) of telecine images that are input at a rate of M frames per second;
   normalizing the Frame Totals of Absolute Local Field Difference (FT) and outputting a vector of normalized Frame Totals of Absolute Local Field Difference (NFT), which are normalized per every five frames, wherein the normalization is performed according to $$NFT = \left| \frac{FTi - MD}{K} \right|$$

wherein, FTi is Frame Total Field Difference (FT) of the i-th frame, MD represents the median value of the Frame Total Field Difference (FT) of five consecutive frames, and K represents a denominator;
   comparing the vector of the normalized Frame Totals of Absolute Local Field Difference (NFT) in a five-frame unit to a reference template; and
   controlling the number of video frames input at the rate of M frames per second and the number of original film frames that are recovered from the input video frames and output at a rate of N frames per second.

6. The recording medium of claim 5, wherein each Frame Total of Absolute Local Field Difference (FT) is the sum of the absolute values of the difference between the sum of the luminance values of pixels on every odd line of one pixel region and the sum of the luminance values of pixels on every even line of the one pixel region, for a plurality of n×m pixel regions in the video frame.

7. The recording medium of claim 5, wherein calculating the Frame Totals of Absolute Local Field Difference (FT)- of the input video frames comprises:
   dividing each of the video frames into a plurality of n×m pixel pixel regions;
   calculating Absolute Local Field Difference for each of the plurality of pixel regions, which are defined as the absolute value of the difference between the sum of the luminance values of pixels on every odd line of the pixel region and the sum of the luminance values of pixels on every even line of the pixel region; and
   calculating the Frame Total of Absolute Local Field Difference (FT) which are defined as sum of the Absolute Local Field Difference of all of the plurality of pixel regions forming the respective video frame.

8. An apparatus for performing an inverse telecine process, comprising:
   a Field Difference Detection Unit for calculating a Frame Total of Absolute Local Field Difference (FT) of telecine images that are input at a rate of M frames per second;
   a normalization unit for normalizing the Frame Totals of Absolute Local Field Difference (FT), which are output from the Field Difference Detection Unit, and for outputting a vector of normalized Frame Totals of Absolute Local Field Difference (NFT) that are normalized in a five-frame unit, wherein the normalization is performed according to $$NFT = \left| \frac{FTi - MD}{K} \right|$$

wherein, FTi is Frame Total Field Difference (FT) of the i-th frame, MD represents the median value of the Frame Total Field Difference (FT) of five consecutive frames, and K represents a denominator;

a comparing unit for comparing the vector of normalized Frame Totals of Absolute Local Field Difference (NFT) that are normalized in the five-frame unit, to a reference template; and a frame buffer unit for controlling the number of video frames that are input in the rate of M frames per second, and the number of original film frames that are recovered from the input video frames and output at a rate of N frames per second.

9. The apparatus of claim 8, wherein each Frame Total of Absolute Local Field Difference (FT) is the sum of the absolute values of the difference between the sum of the luminance values of pixels on every odd line of the pixel region and the sum of the luminance values of pixels on every even line of the pixel region included in the video frame.

10. The apparatus of claim 8, wherein the Field Difference Detection Unit divides each video frame respectively into n×m pixel regions, calculates the Absolute Local Field Difference of each pixel region which is defined as the absolute value of the difference between the luminance of pixels on odd lines of one pixel region and the luminance of pixels on even lines of the one pixel region, and calculates the Frame Total of Absolute Local Field Difference (FT) of each video frame, which is defined as sum of the Absolute Local Field Differences of the plurality of n×m pixel regions that forming the video frame.

11. The apparatus of claim 8, further comprising a look-up table for storing a plurality of templates.

12. The apparatus of claim 11, wherein the comparing unit comprises:

a first comparator for comparing the vector of normalized Frame Totals of Absolute Local Field Difference (NFT) with templates stored in the look-up table, and for outputting an output signal according to the compared result; and a second comparator for comparing a reference template to the output from the first comparator, to output a frame load signal and a synthesis command, wherein the frame load signal controls the number of video frames input at a rate of M frames per second, and the synthesis command designates the synthesizing method of the telecine images.

13. The method of claim 8, further comprising clipping the NFT value of each frame so that the NFT of each frame is between 0 and 1.

14. A method for performing an inverse telecine process to convert video frames into original film frames, comprising:

calculating a Frame Totals of Absolute Local Field Difference (FT) for each frame of video input at a rate of M frames per second; wherein the Frame Total of Absolute Local Field Difference (FT) of each video frame is defined as sum of the Absolute Local Field Difference of all of the plurality of n×m pixel regions forming the respective video frame; and normalizing the Frame Totals of Absolute Local Field Difference (FT) of the video frames in a five-frame unit, wherein the normalization is performed according to $$NFT = \left|\frac{FTi - MD}{K}\right|$$

wherein, FTi is Frame Total Field Difference (FT) of the i-th frame, MD represents the median value of the Frame Total Field Difference (FT) of five consecutive frames, and K represents a denominator, wherein the Absolute Local Field Difference for each of the plurality of n×m pixel regions, are defined as the absolute value of the difference between the sum of the luminance values of pixels on every odd line of one pixel region and the sum of the luminance values of pixels on every even line of the one pixel region.

15. The method of claim 14, wherein n equals m.

16. The method of claim 14, wherein n equals 2.

17. The method of claim 14, wherein m equals 1.

18. The method of claim 14, further comprising the steps of:

outputting a vector of the normalized Frame Totals of Absolute Local Field Difference (NFT); and comparing the vector of normalized Frame Totals of Absolute Local Field Difference (NFT) to a plurality of templates, and identifying the template that is most similar to the vector of normalized Frame Totals of Absolute Local Field Difference (NFT).

19. The method of claim 14, further comprising the steps of:

comparing a signal that represents the most similar template to a signal corresponding to a reference template, and outputting a frame load signal and a synthesis command; and controlling the number of video frames, which are input in a rate of M frames per second, as responding to the frame load signal, generating original film frame by synthesizing the input video frames in a predetermined way as responding to the synthesis command, and outputting the original film frames in a rate of N frames per second.

20. An apparatus for performing an inverse telecine process to convert video frames into original film frames, comprising:

a frame buffer unit including a plurality of frame buffers connected in series for storing video frames, and for converting the input video frames into the original film frames in response to a frame load signal and a synthesis command;

a Field Difference Detection Unit for receiving a video frame output from the frame buffer unit and for calculating a Frame Total of Absolute Local Field Difference (FT) for the received video frame;

a normalization unit connected to the Field Difference Detection Unit for normalizing the Frame Totals of Absolute Local Field Difference (FT) and outputting a vector of normalized Frame Totals of Absolute Local Field Difference (NFT) that are normalized in a five-frame unit, and normalizing the Frame Totals of Absolute Local Field Difference (FT) of the video frames in a five-frame unit, wherein the normalization is performed according to $$NFT = \left|\frac{FTi - MD}{K}\right|$$

wherein, FTi is Frame Total Field Difference (FT) of the i-th frame, MD represents the median value of the Frame Total Field Difference (FT) of five consecutive frames, and K represents a denominator;

a look-up table for storing a plurality of templates;

a first comparator for comparing the vector of normalized Frame Totals of Absolute Local Field Difference (FT) that are output from the normalization unit, with a plurality of templates stored in the look-up table, and identifying the template which is most similar to the vector of normalized Frame Totals of Absolute Local Field Difference (NFT); and a second comparator for comparing a reference template to the template identified by the first comparator, and for outputting the frame load signal and the synthesis command, wherein the frame load signal controls the number of video frames input into the frame buffer unit, and the original film frames are synthesized using the video frames stored in the plural frame buffers in response to the synthesis command.

* * * * *